(12) United States Patent
Coots

(10) Patent No.: US 11,772,903 B2
(45) Date of Patent: Oct. 3, 2023

(54) TIE PLATE DISPENSER AND METHOD THEREFORE

(71) Applicant: B & B Metals, Inc., Shepherdsville, KY (US)

(72) Inventor: Coty T. Coots, Shepherdsville, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 0 days.

(21) Appl. No.: 17/895,592

(22) Filed: Aug. 25, 2022

(65) Prior Publication Data
US 2022/0411199 A1   Dec. 29, 2022

Related U.S. Application Data

(63) Continuation of application No. 16/664,333, filed on Oct. 25, 2019, now Pat. No. 11,427,408.

(60) Provisional application No. 62/756,206, filed on Nov. 6, 2018.

(51) Int. Cl.
| | |
|---|---|
| *B65G 47/22* | (2006.01) |
| *B65G 47/92* | (2006.01) |
| *B65G 47/34* | (2006.01) |
| *B65G 47/88* | (2006.01) |
| *E01B 29/32* | (2006.01) |

(52) U.S. Cl.
CPC ............. *B65G 47/22* (2013.01); *B65G 47/34* (2013.01); *B65G 47/8838* (2013.01); *B65G 47/92* (2013.01); *E01B 29/32* (2013.01)

(58) Field of Classification Search
None
See application file for complete search history.

(56) References Cited

U.S. PATENT DOCUMENTS

| | | |
|---|---|---|
| 3,690,264 A | 9/1972 | Plasser |
| 3,731,455 A | 5/1973 | Theurer |
| 4,241,663 A | 12/1980 | Lund et al. |
| 4,522,323 A | 6/1985 | Labounty |
| 4,722,283 A | 2/1988 | Holley |
| 5,048,424 A | 9/1991 | Madison et al. |
| 6,807,909 B1 | 10/2004 | Coots |
| 7,406,919 B2 | 8/2008 | Coots |

(Continued)

FOREIGN PATENT DOCUMENTS

| | | |
|---|---|---|
| CA | 2468106 A1 | 12/2004 |
| CA | 2565458 A1 | 5/2007 |

(Continued)

OTHER PUBLICATIONS

Canadian Patent Office, Examiners Report issued in Application No. 3,122,448, 4 pages, dated Dec. 1, 2022.

(Continued)

*Primary Examiner* — Kavel Singh
(74) *Attorney, Agent, or Firm* — Dinsmore & Shohl LLP

(57) ABSTRACT

Present embodiments relate to a tie plate dispenser which aligns tie plates for dispensing based on rail base rather than outer edges of the tie plate. Thus tie plates are aligned and located in a differing manner than prior art systems. Further, the tie plate dispenser includes an opening over which a magnet is disposed to retain a tie plate over the opening. The tie plate over the opening may be selectively released by disengaging the tie plate from the magnet.

17 Claims, 14 Drawing Sheets

(56) References Cited

U.S. PATENT DOCUMENTS

| | | |
|---|---|---|
| 7,827,916 B2 | 11/2010 | Coots |
| 8,166,883 B1 | 5/2012 | Coots |
| 8,316,774 B1 | 11/2012 | Coots |
| 8,393,846 B1 | 3/2013 | Coots |
| 8,443,733 B2 * | 5/2013 | Coots ................... E01B 29/32 104/5 |
| 8,459,924 B1 | 6/2013 | Coots |
| 8,528,484 B2 | 9/2013 | Helmick |
| 8,636,460 B1 | 1/2014 | Coots |
| 8,794,423 B2 | 8/2014 | Sasstamo et al. |
| 9,016,208 B2 | 4/2015 | Coots |
| 9,038,542 B2 | 5/2015 | Coots |
| 9,328,465 B1 | 5/2016 | Coots |
| 9,422,673 B2 | 8/2016 | Coots |
| 9,446,662 B2 | 9/2016 | Coots |
| 9,745,132 B2 | 8/2017 | Coots |
| 9,745,150 B2 | 8/2017 | Coots |
| 9,752,286 B2 | 9/2017 | Coots |
| 10,094,071 B2 | 10/2018 | Coots |
| 10,112,215 B1 | 10/2018 | Coots |
| 10,316,471 B2 | 6/2019 | Coots |
| 10,329,100 B1 | 6/2019 | Coots |
| 10,427,876 B2 | 10/2019 | Coots |
| 11,427,408 B2 | 8/2022 | Coots |
| 2017/0349377 A1 | 12/2017 | Coots |
| 2019/0153678 A1 | 5/2019 | Coots |
| 2020/0141065 A1 | 5/2020 | Coots |
| 2021/0404122 A1 | 12/2021 | Coots |
| 2023/0121877 A1 | 4/2023 | Coots |

FOREIGN PATENT DOCUMENTS

| | | |
|---|---|---|
| CA | 2644242 A1 | 5/2009 |
| CA | 2810688 A1 | 9/2013 |
| CA | 2814607 A1 | 4/2014 |
| CA | 2843094 A1 | 8/2014 |
| CA | 3024667 A1 | 5/2019 |
| CA | 3060645 A1 | 5/2020 |
| CA | 3122448 A1 | 12/2021 |

OTHER PUBLICATIONS

U.S. Appl. No. 16/418,155, filed May 21, 2019.
U.S. Appl. No. 16/433,720, filed Jun. 6, 2019.
Canadian Patent Application No. 3046462 filed on Jun. 14, 2019.
Canadian Patent Application No. 3060645 filed on Oct. 29, 2019.
Canadian Patent Application No. 3,122,448 filed on Jun. 15, 2021.
U.S. Appl. No. 16/910,918, filed Jun. 24, 2020.
U.S. Appl. No. 16/664,333, filed Oct. 25, 2019.

* cited by examiner

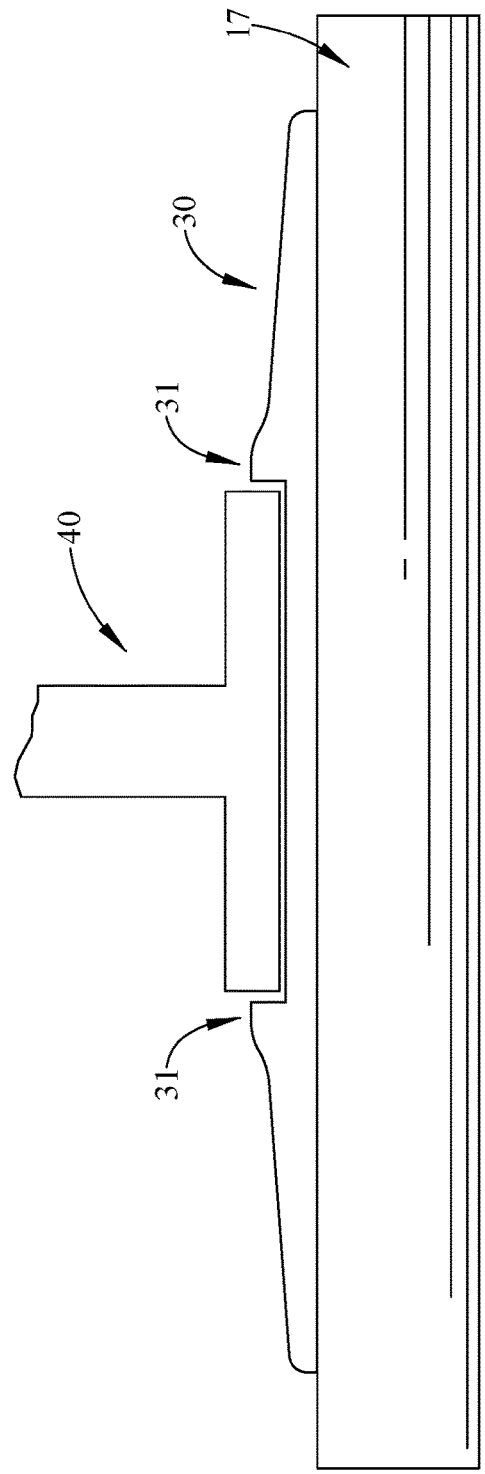
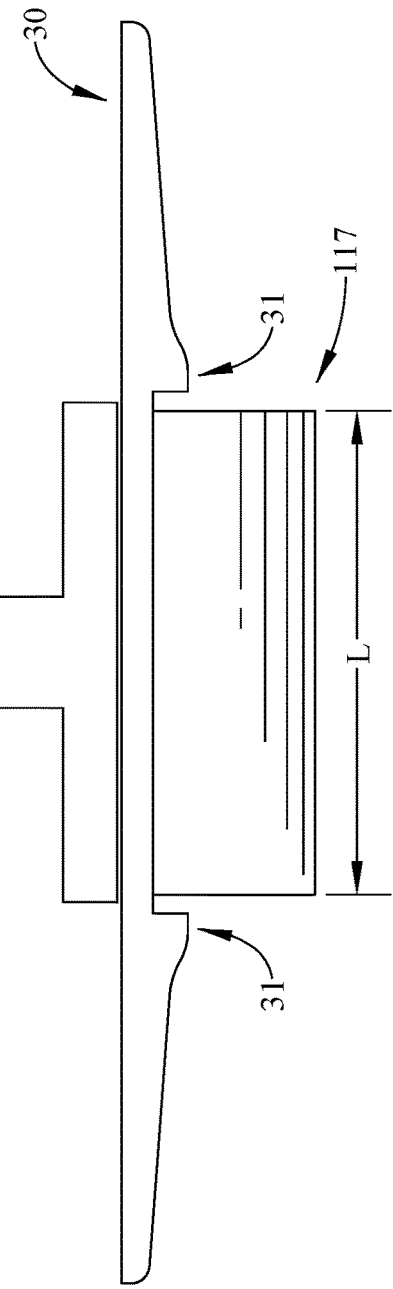

TIE PLATE DISPENSER AND METHOD THEREFORE

CLAIM TO PRIORITY

This continuation patent application claims priority to and benefit of, under 35 U.S.C. § 120, U.S. Non-Provisional patent application Ser. No. 16/664,333, filed Oct. 25, 2019 and titled "Tie Plate Dispenser and Method Therefore", which claims priority to U.S. Provisional Patent Application Ser. No. 62/756,206, filed Nov. 6, 2018 also titled "Tie Plate Dispenser and Method Therefore," all of which is incorporated by reference herein.

BACKGROUND

1. Field of the Invention

Present examples relate to a tie plate dispenser and methods therefore. More specifically, present embodiments relate to embodiments for dispensing tie plates on or near rail road ties.

2. Description of the Related Art

It may be desirable to arrange tie plates on a tie plate dispenser in a manner other than by an outer edge of the tie plate. When the tie plates are all the same size, alignment by the outer edge is acceptable. However some railroad companies allow for use of different size tie plates. In this situation, with different sizes of tie plates, arrangement by edges of differing dimension may not be satisfactory. There may be a desire to arrange tie plates based on rail base, that is a distance between the two shoulders of a tie plate. If the tie plates are aligned by this rail base, the railroad track assembly may utilize the tie plates of differing sizes.

In addition to alignment, it may also be desirable to retain and dispense or discharge the tie plates on to, or adjacent to, the railroad assembly. The dispensing arrangement should however function with the alignment system regardless of tie plate size.

The information included in this Background section of the specification, including any references cited herein and any description or discussion thereof, is included for technical reference purposes only and is not to be regarded subject matter by which the scope of the invention is to be bound.

SUMMARY

Present embodiments relate to a tie plate dispenser which aligns tie plates for dispensing based on rail base rather than outer edges of a tie plate. Thus tie plates are aligned and located in a differing manner than prior art systems. Further, the tie plate dispenser includes an opening over which a magnet is disposed to retain a tie plate over the opening. The tie plate over the opening may be selectively released by disengaging the tie plate from the magnet.

According to some embodiments, a tie plate dispenser comprises a conveyor configured to move a plurality of tie plates from a first location to a second location, a guide positioned adjacent to the conveyor, the guide configured to engage at least one shoulder of a tie plate, the guide extending longitudinally along the direction of the conveyor, wherein the guide engages at least one of the shoulders of the tie plate and positions the tie plate relative to a rail base.

Some optional features may be utilized with the tie plate dispenser either alone or in combination with other embodiments. Such optional embodiments may include, but are not limited to the following. The guide may have a taper at one end. The taper may locate the tie plate on the conveyor. The guide may align the at least one tie plate. The guide may have a flat surface including a low friction material and comprise a beam. The guide may have an upper edge and a trough depending from said upper edge. The trough may be positioned between the shoulders of the tie plate. The trough may have a lower surface formed of a low friction material. The tie plate dispenser may further comprising a guide frame that extends above the conveyor. The guide may be suspended from the guide frame. The tie plate dispenser may comprise a gap located between the guide and the conveyor to allow passage of the tie plates therebetween. The tie plate may comprise at least one shoulder which faces up or faces down.

According to some embodiments, a tie plate dispenser may comprise a conveyor configured to move a plurality of tie plates, a conveyor frame which extends a preselected distance beyond an end of a conveying surface, the preselected distance defining an opening, at least one magnet disposed above the opening, the at least one magnet retaining at least one of the plurality of tie plates over the opening, wherein the at least one tie plate is selectively released from the magnet through the opening.

Some optional features may be utilized with the tie plate dispenser either alone or in combination with other embodiments. Such optional embodiments may include, but are not limited to the following. The opening may be sized to allow passage of the at least one tie plate. The opening may be sized to receive the at least one tie plate and a portion of a second, adjacent tie plate of the plurality of tie plates. The conveying surface may be a roller conveyor, belt conveyor, gravity feed conveyor, a chute, a vibratory conveyor, or combinations of any of the foregoing. The conveying surface supporting a second adjacent tie plate of the plurality of tie plates. The tie plate dispenser may further comprise an actuator to selectively disengage the at least one tie plate from the at least one magnet. The at least one magnet may be a permanent magnet or an electromagnet. The tie plate dispenser may further comprise a sensor to create a signal to the release the tie plate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a tie plate dispenser will now be described by way of examples. These embodiments are not to limit the scope of the claims as other embodiments of a tie plate dispenser will become apparent to one having ordinary skill in the art upon reading the instant description. Non-limiting examples of the present embodiments are shown in figures wherein:

FIGS. 11A and 11B are side views of rollers wherein the tie plate is oriented in a first orientation relative to the rollers and in a second orientation relative to the rollers of shorter length;

DETAILED DESCRIPTION

Figure 1:
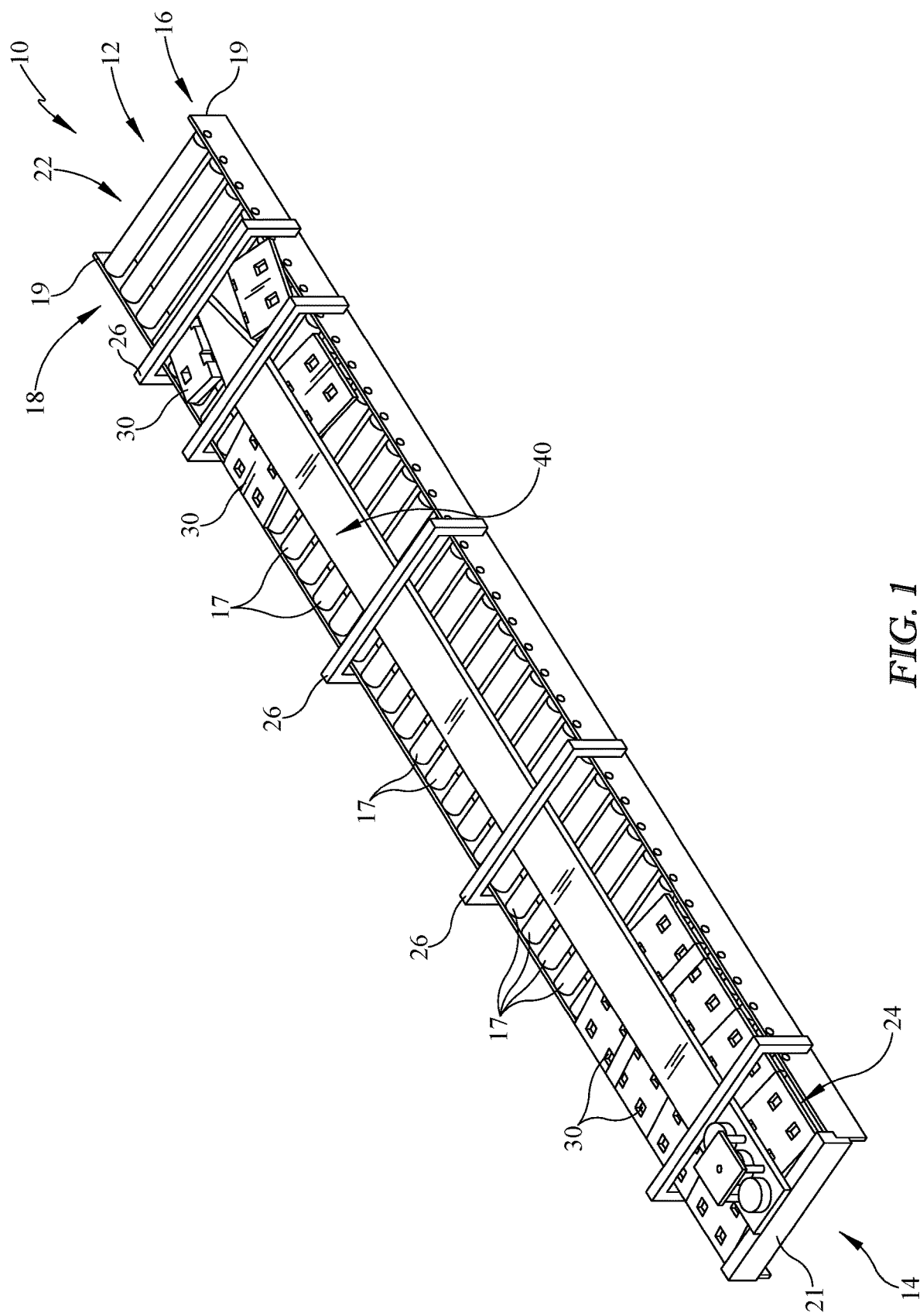
FIG. 1 is a perspective view of an embodiment of a tie plate dispenser.

It is to be understood that a tie plate dispenser and method therefore is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring to FIGS. 1-14, the present embodiments provide a tie plate dispenser which dispenses or distributes tie plates along a railroad track assembly. A railroad track assembly includes, in general, a plurality of railroad ties, each having a pair of tie plates. A rail track is disposed across each tie plate and run generally perpendicular to the railroad ties, to attach the tracks to the supporting tie. One skilled in the art will understand these railroad track assemblies. The tie plate dispenser provides a guide to align and locate the tie plates along a conveyor with reference to the rail base, that is a portion of the tie plate between the shoulders of a double shoulder tie plate or alternatively relative to at least one shoulder. After aligning the tie plate in such manner, the tie plates are advanced to an area of the dispenser where they are retained and selectively released at a desired time, location or both.

With reference now to FIG. 1, a perspective view of the tie plate dispenser 10 is shown. The tie plate dispenser 10 has a first end 12, for example an entrance end, and a second end 14, for example a discharge or exit end. The tie plate dispenser 10 may be in feed communication with a tow vehicle having a rail truck bed or a towed vehicle such as on a flatbed trailer for rail use, road use, or both, and further either of which may have tie plate sorting capability and may feed the tie dispenser 10 with tie plates to be dispensed along a railroad assembly during maintenance procedures. With brief reference to FIG. 9, the tie plate dispenser 10 is shown disposed on a wheeled frame, or buggy, 28 which may be towed behind a rail car, rail truck or other two vehicle. The tie plate dispenser 10 is typically angled from top to bottom to aid in feeding the tie plates 30 toward the lower discharge end 14.

With reference again to FIG. 1, the tie plate dispenser 10 may be in some embodiments a conveyor 16, which may be any of various types of conveying structures, including but not limited to roller conveyors, belt conveyors, gravity feed conveyors, chutes, vibratory conveyors, combinations of any of these or other structure which generally move a part from a first position to a second position. While various conveyor types may be utilized, the instant conveyor 16 is depicted as a roller conveyor having a plurality of rollers 17, the tops of which define a conveying surface 22, generally shown as an arrow in the direction of tie plate movement. The instant conveyor 16 sequentially moves a plurality of tie plates 30 from the first end 12 to the second end 14. The conveyor 16 may be a gravity feed which is disposed on an angle from a higher first entrance end 12 to a lower second discharge end 14.

The conveyor 16 may include a conveyor frame 18 defined by one or more frame structural elements 19 which support the rollers 17. In the instant embodiment, the frame 18 is defined by a first structural element 19 and a second structural element 19 which are positioned opposite one another and extend in a longitudinal direction pertaining to a feed direction of the tie plates 30. It should also be understood however, that the conveyor 16 may be curved and that the tie plate dispensing system may be implemented in such conveyor type as well. The frame structural elements 19 defining frame 18 may be implemented in various manners including other structural shapes and designs. While the instant embodiment shows generally flat plate structures, other structures may be used, for non-limiting example channel, angle iron shapes, or box/rectangular shapes may be used to define the frame 18 and support the rollers 17. Additionally, these or other structures may be joined, for example by welding, by additional structures in order to define a one piece frame.

Near the second end 14 of the frame 18, the structural elements 19 extend beyond the last roller 17, and/or in other embodiments, beyond the end of the conveying surface. At the ends of the frame elements 19, the frame 18 may also have end members. For example, the second end 14 of the frame 18 also includes an end member 21. As will be described further, an opening 24 is formed wherein the tie plates 30 may be dispensed from the conveyor 16 on to a railroad track assembly below the conveyor 16. For example, the tie plates 30 may be disposed on railroad ties or in some embodiments, the tie plates 30 may be disposed alongside the railroad track assembly. The opening 24 may be formed by an open area of the dispenser or may be defined by an end of the dispenser, where or not it is bounded by other structure. As stated before, the opening 24 may be defined by an open area of the dispenser 10 or may be defined by an end of the conveyor 16 wherein the tie plates fall from the end, or some combination.

The conveyor 16 and frame 18 may further comprise a plurality of supports 26 which extend above the rollers 17. The supports 26 may be arranged in various manners, and for example may extend between the structural elements 19 or may extend over the conveying surface 22. Various configurations of supports 26 may be utilized.

Figure 9:
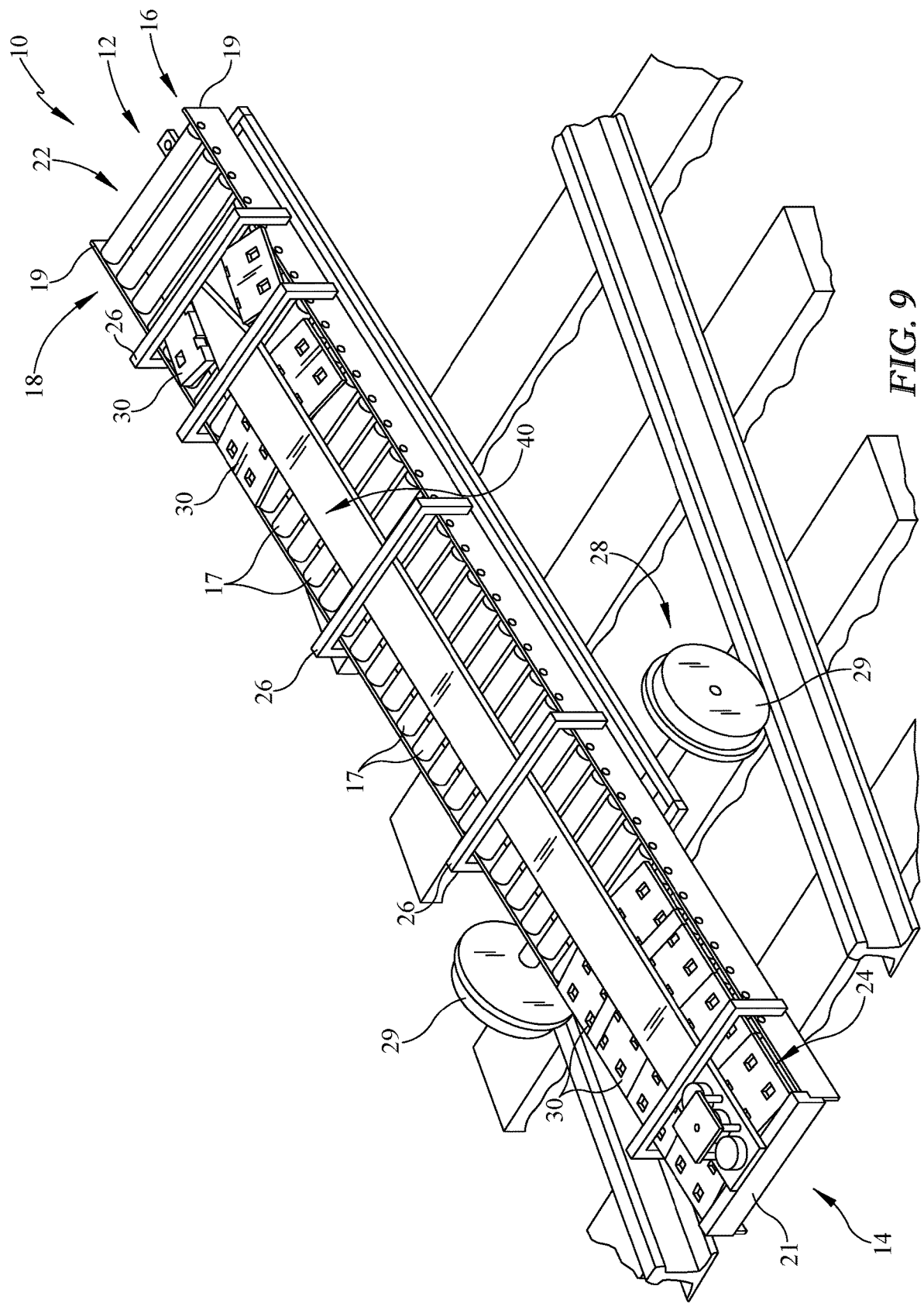
FIG. 9 is a perspective view of an embodiment a dispenser mounted on a buggy frame for towing behind a railed vehicle.

With brief additional reference to FIG. 9, the conveyor 16 may also be moveable via a buggy 28. The buggy 28 include rail wheels 29 which movably support the conveyor 16, so that the conveyor 16 may be mobile along the railroad track. In some embodiments, the conveyor 16 may pivot from near an upper end, so that the lower end may be located at any of various locations relative to the tie plate 30 or the ground below. For example, a hitch ball and/or fifth wheel arrangement may be used. In alternative embodiments, the conveyor 16 may be constructed to slide rather than pivot, so that the tie plates 30 may be dispensed at various locations relative to the ties or the ground.

Figure 2:
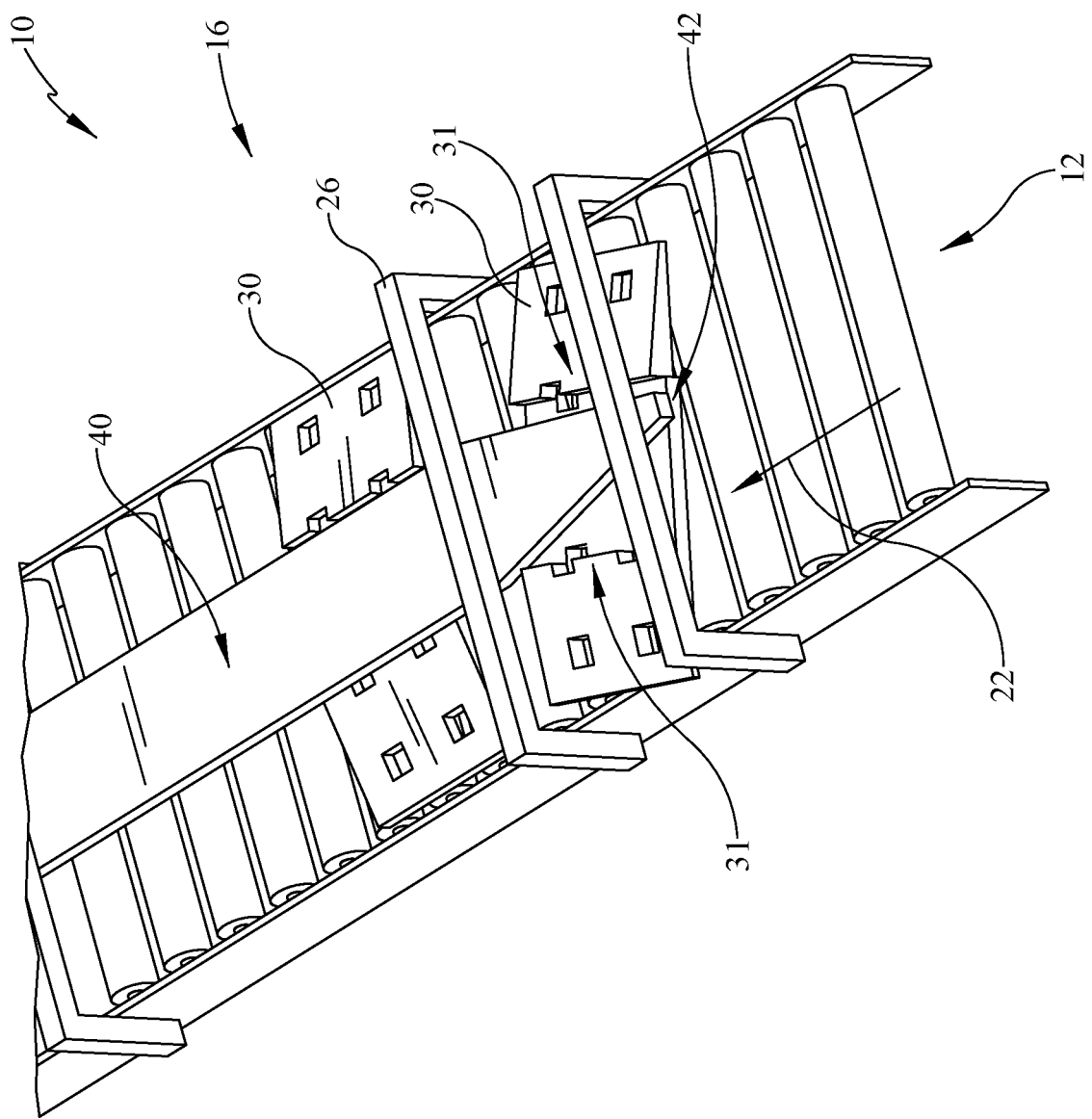
FIG. 2 is a detail perspective view of an entrance end of the tie plate dispenser.

With additional reference to FIG. 2, the first end 12 of the dispenser 10 is depicted. The tie plate dispenser 10 further comprises a guide 40. The guide 40 is a longitudinally extending structure or combination of structures that extends in the direction of the tie plate movement along the conveyor 16. The guide 40 is depicted as flat stock in some embodiments, but may be other structural shapes as well. For example, the guide 40 may also be embodied by the flat stock as shown but may further comprise a beam to which the flat stock is connected, wherein the beam may be connected to the support 26 or may be connected to adjustable actuators as described further herein.

At a first end 42 of the guide 40, the guide is tapered from a narrow width. The first end provides a narrow width in order to increase the likelihood of positioning the first guide end 42 between the shoulders 31 (FIG. 2) of the tie plate 30. As shown, the tie plate 30 located at the narrow end is out of alignment relative to the direction of movement. However, the guide 40 will correct the skewed tie plate 30 as it moves forward along the tie plate conveyor 16.

As shown in the view of FIG. 2, the tie plates may be enter the dispenser 10 askew. When this occurs, the narrow first guide end 42 still engages the tie plate 30 (nearest first end 12) between the shoulders 31. Briefly, the tie plates 30 may be of varying sizes and varying shapes. Many tie plates 30 are rectangular in shape as illustrated and may comprise two shoulders 31 which are extending from the upper surface of the tie plate. According to some examples, the shoulders 31 provide a locating and alignment feature for positioning of a railroad track in order to connect the track or rail to the railroad tie. Some tie plates may have a single shoulder 31 while some may have two as depicted. The number is not to be considered limiting, however, the guide may use at least one, or two, shoulder in order to align the tie plates 30, rather than the outer edges of the tie plates. By relying on the outer edges, the positioning and alignment is then partially dependent on outer dimensions, and therefore alignment may vary where batches of multiple sized tie plates are utilized. Thus where two shoulders are used, the alignment may be independent of tie plate dimension and use of multiple sizes of tie plates may not affect the operation.

As the guide widens from the first end 42 to its full width, the tie plate 30 will rotate to it proper alignment and position on the conveyor 16. The rotation is due to engagement between the shoulders 31 and guide 40. Further, the guide 40 retains the tie plate 30 in desired position laterally along the conveyor 16, while the tie plate 30 continues moving longitudinally along the conveyor 16. It should be understood that some tolerance is necessary to allow for movement of the tie plate, rather than stoppage, during use of the dispenser 10.

The guide 40 may be supported in a number of ways. According to some embodiments, the guide 40 is supported from above by the supports 26. In such a way, the guide 40 is disposed at a height above the conveying surface 22. This defines a gap 41 (FIG. 3) wherein the tie plate 30 may be disposed and move through toward the second end of the dispenser 10. The gap 41 is sized so that the guide 40 is positioned between the shoulders 31 of a tie plate 30 and at a height so not to stop movement of the tie plate therebetween. As one skilled in the art will understand, the tie plates 30 may be formed in differing sizes and accordingly, may have heights or thicknesses which differ. For example, some tie plates may have a thickness of up to ¾ of an inch while other size tie plates may have a thickness of about ⅞ of an inch. These dimensions are merely examples and others may be utilized, and therefore should not be considered limiting.

Figure 10:
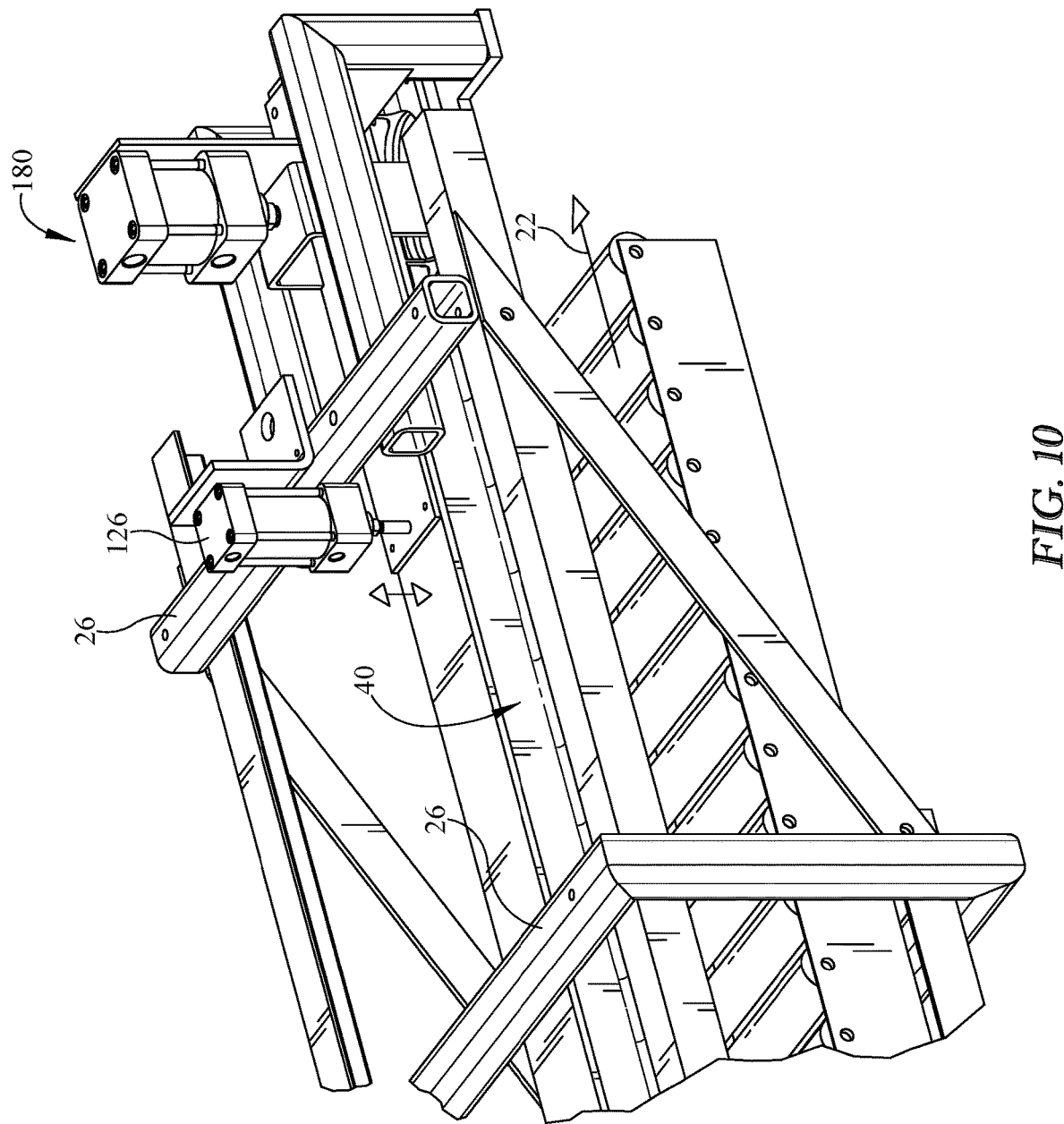
FIG. 10 is a perspective view of the tie plate dispenser with an actuator to adjust the height of the guide from the conveyor surface.

The guide 40 may also be adjustably supported so that the height of the guide 40 may be changed relative to the conveying surface 22 below. Therefore, the adjustability of the guide in a height or vertical dimension may allow for appropriate clearance of tie plates of differing sizes which improves usage of the dispenser. As shown in FIG. 10 for example, an actuator 126 may be mounted to the supports 26 in order to move the guide 40 vertically and vary the height relative to the conveying surface 22. The one or more actuators 126 may be supported at various locations along the conveyor path for raising and lowering the guide 40. The actuator 126 may be fixed to a frame member, structure, or other support 26 of the dispenser 10 and may have a piston or other movable structure which connects to the guide 40. In this way, the movement of the piston in a vertical direction will move the guide 40 vertically. The actuator 126 may be electrical, hydraulic, pneumatic, combinations, or other movable structures. Likewise, the actuator 126 may have a motor for example which rotates to cause linear motion of an actuation element alternative to typical to a piston.

Adjacent to the guide actuator 126 is the actuator 180 which releases the tie plates 30 from the magnets 60. Also, the embodiment shows that a single actuator 180 may be utilized rather than the two depicted in FIG. 7.

Figure 3:
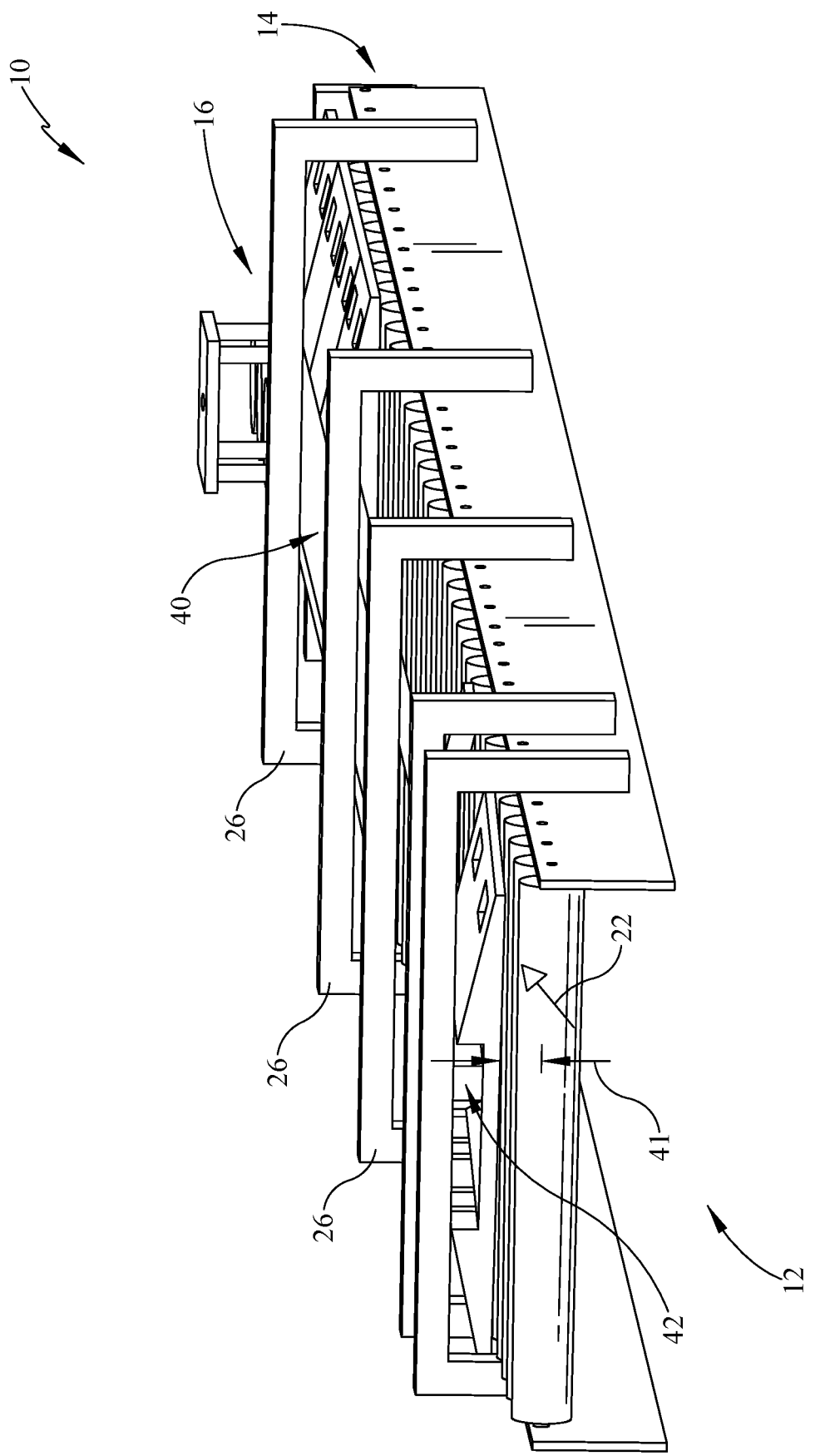
FIG. 3 is an end perspective view of the tie plate dispenser depicting the tie plates passing between the guide and the roller conveyor.

With brief additional reference to FIG. 3, a perspective end view of the tie plate dispenser is shown. In this view, the tie plates 30 are shown moving along the conveying surface 22. The guide is disposed above the conveying surface and shows how the tie plates pass on the conveying surface and beneath the guide 40. However, the guide 40 is disposed between the shoulders 31 (FIG. 2) of the tie plate to locate the tie plates as desired on the conveyor 16. Further, the tie plates are straightened as the pass by the first guide end 42. Once the tie plates pass this portion of the guide 40, the tie plates are also aligned by a rail base or a center line between the shoulders 31 (with some tolerance). Thus, the tie plates need not be aligned by an outer edge thereof and tie plates of different sizes may be run through the tie plate dispenser 10.

Also shown in FIG. 3 is a depiction of the support of the guide 40 from the supports 26. This is one embodiment however, the guide 40 may be supported from sides or other locations. Thus it should be understood that the guide 40 may be supported in a plurality of ways.

Figure 4:
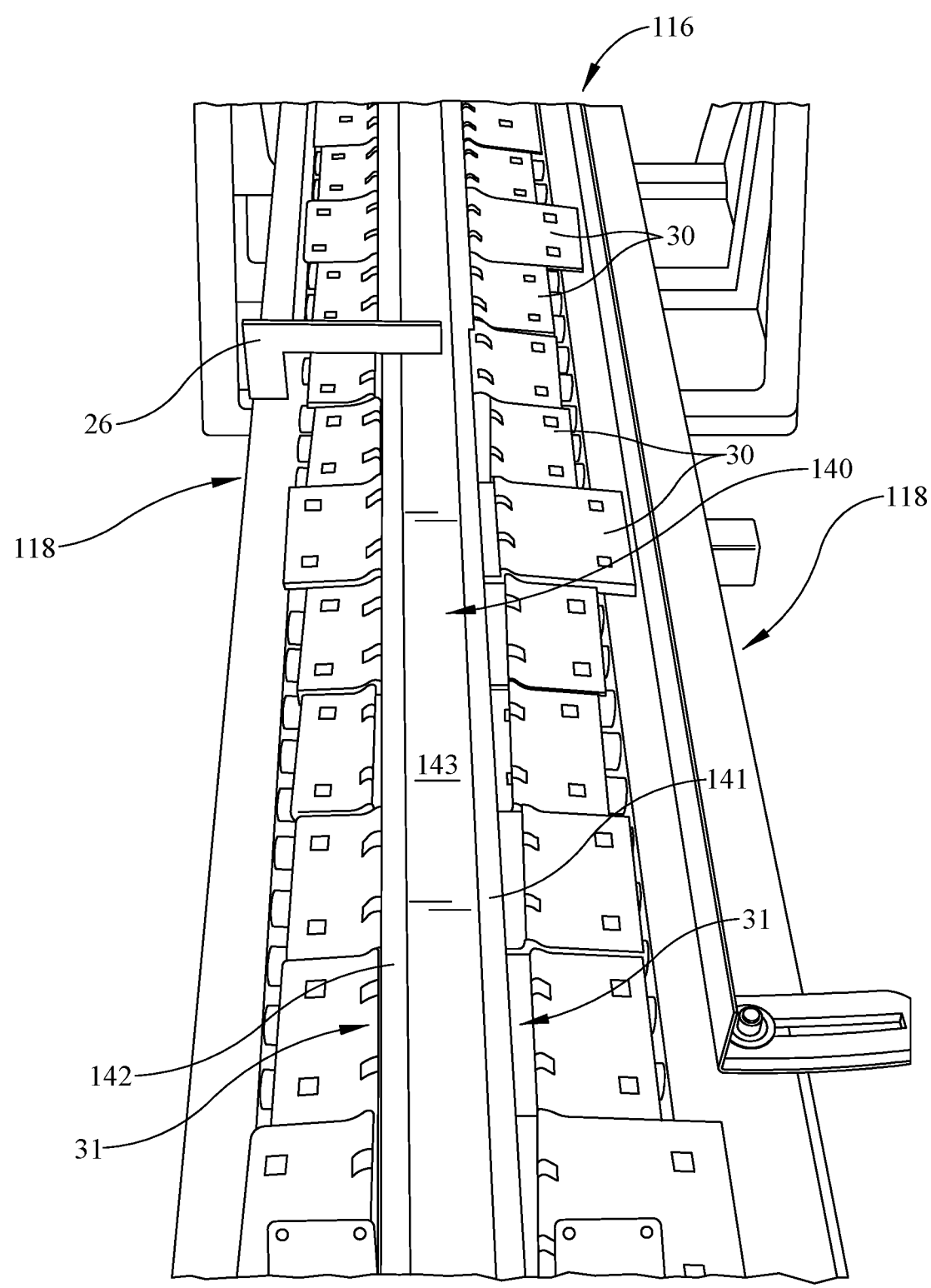
FIG. 4. is an upper perspective view of an embodiment of the tie plate dispenser.

Referring now to FIG. 4, an upper perspective view of the dispenser 10 is shown wherein the tie plates 30 are shown moving along the conveyor 116. The guide 140 is disposed between the shoulders 31 of each tie plate 30 moving along the conveyor 16. The tie plates 30 are generally aligned along a centerline between the shoulders 31, with some tolerance. The figures also depicts that the tie plates may be of differing sizes. That is, there may be various sizes of tie plates, and this does not stop the use of the tie plate dispenser 10.

Also shown in this view, one skilled in the art may realize that the frame 118 of the conveyor 16 is different than previous embodiments. Other structures may be utilized to define the conveyor. Without reference to any specific type of conveyor or the frame design, one skilled in the art should understand that various frame types and designs will be within the scope of the embodiments.

Also shown in this view, the guide may be of various designs. The guide 140 is provided with first and second structures 141, 142 and a low friction material 143 extending between the first and second structures 141, 142. In this embodiment, the guide 140 has upper edges defined by the first and second structures and a trough therebetween defined by the low friction material. Further, for example, in this example, the structures are shown as angle irons, however other structural shapes may be utilized. In this embodiment, the tie plates 30 are only in contact, if at all, with the low friction material 143 extending between the first and second structures. In some embodiments, the low friction material may extend between the first and second structures 141, 142 and extend the entire length of the guide length 140. In other embodiments, it may be desirable to place hard steel or other metal structure at the forward end of the guide 140. In the tapered area which will receive the higher contact forces of the tie plates before they are substantially aligned with the guide 140. In this way, the part steel, metal, or other structure which may be more able to withstand the higher force of the initial contact with the guide 140. Accordingly, the metallic materials at the very forward end of the guide 140 and the low friction material may be used along the remaining distance of the guide 140. In some embodiments, the low friction material may be used beneath a metallic guide structure such that the metal and the low friction material are positioned in layers rather than the low friction material being used between two structures 141, 142 as described. Further, the guide 140 is connected to supports 26 by way of the low friction material 143, or other material extending between the guide structures.

Figure 5:
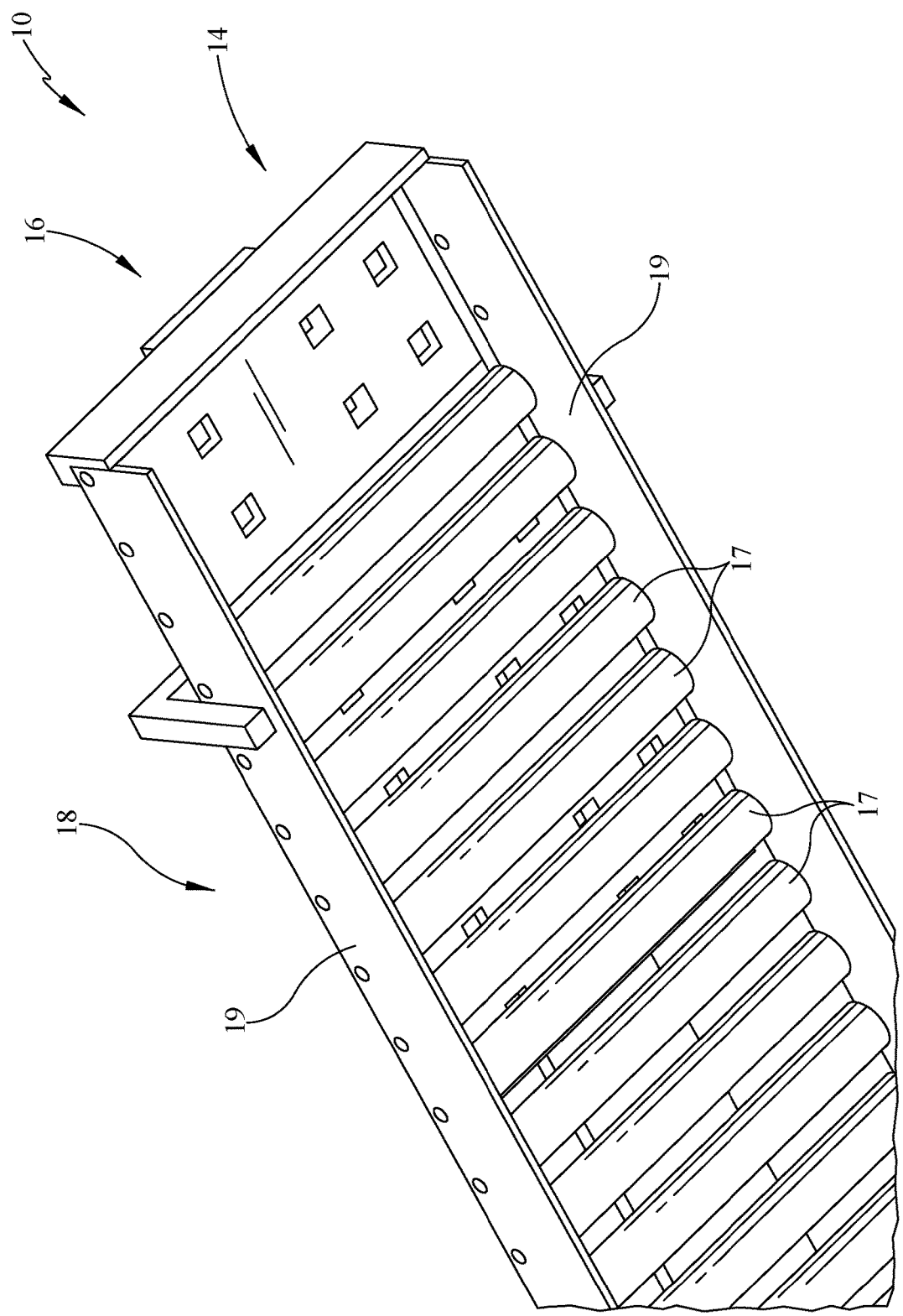
FIG. 5 is a lower perspective view of a second end of the tie plate dispenser.

Referring now to FIG. 5, a lower perspective view of the tie plate dispenser 10 is shown. The lower perspective view shows the opening at the end of the rollers where the frame structural elements 19 extend beyond the rollers they support. At this opening location, the tie plates 30 may be dispensed or discharged in a sequential and selective manner from the dispenser 10.

Figure 6:
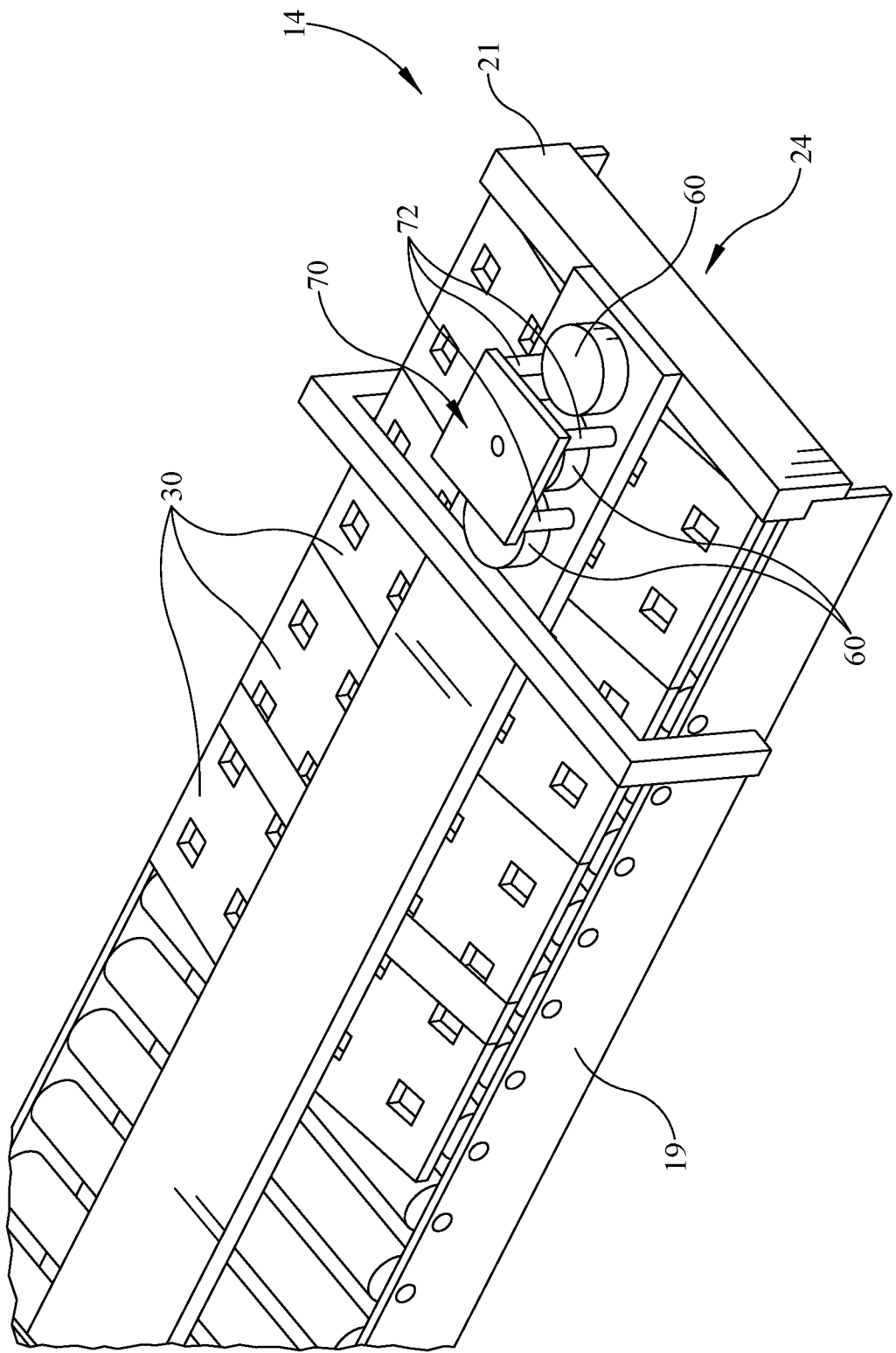
FIG. 6 is an upper perspective view of a dispensing assembly at a second end tie plate dispenser.

Referring now to FIG. 6, an upper perspective view of the tie plate dispenser 10 is shown and with specific reference to the second end 14 thereof. The guide 40, for example, extends over the opening 24. According to some embodiments, a mechanism is provided to retain the last sequential tie plate 30 over the opening. In some embodiments the retaining mechanism 60 may be a magnet, permanent or electromagnet, in order to retain the tie plate. In the embodiment comprising a permanent magnet, the at least one magnet retains the tie plate 30 and the movement of the subsequent tie plates along the dispenser forces the tie plate to a position fully over the opening. Alternately, if an electromagnet is used, the magnet may be turned off then on when the tie plate is in the desired position over the opening.

Some embodiments provide at least one permanent magnet 60. In the instant embodiment, the at least one permanent magnet 60 is defined by three circular magnets. Other shapes and sizes may be used, depending at least in part on the size of the opening. The magnets are shown sized to fit between longitudinal edges of the guide 40.

In the embodiment having a permanent magnet 60, an actuator assembly 70 is used to disengage the tie plate from the at least one magnet 60 and thereby discharge the tie plate on to the railroad track assembly. The instant embodiment utilizes an actuator assembly 70 to move downward and displace the tie plate 30 from the at least one magnet 60, thus causing the tie plate to fall. As shown in FIG. 6, the actuator assembly 70 may utilize a hammer 72 which passes through the guide 40 to push the tie plate downward from the guide 40. The hammer may take various forms and according to the instant embodiment, the hammer may comprise vertical structures passing through or around the guide to push the tie plate 30 over the opening 24 away from the at least one magnet 60.

Figure 7:
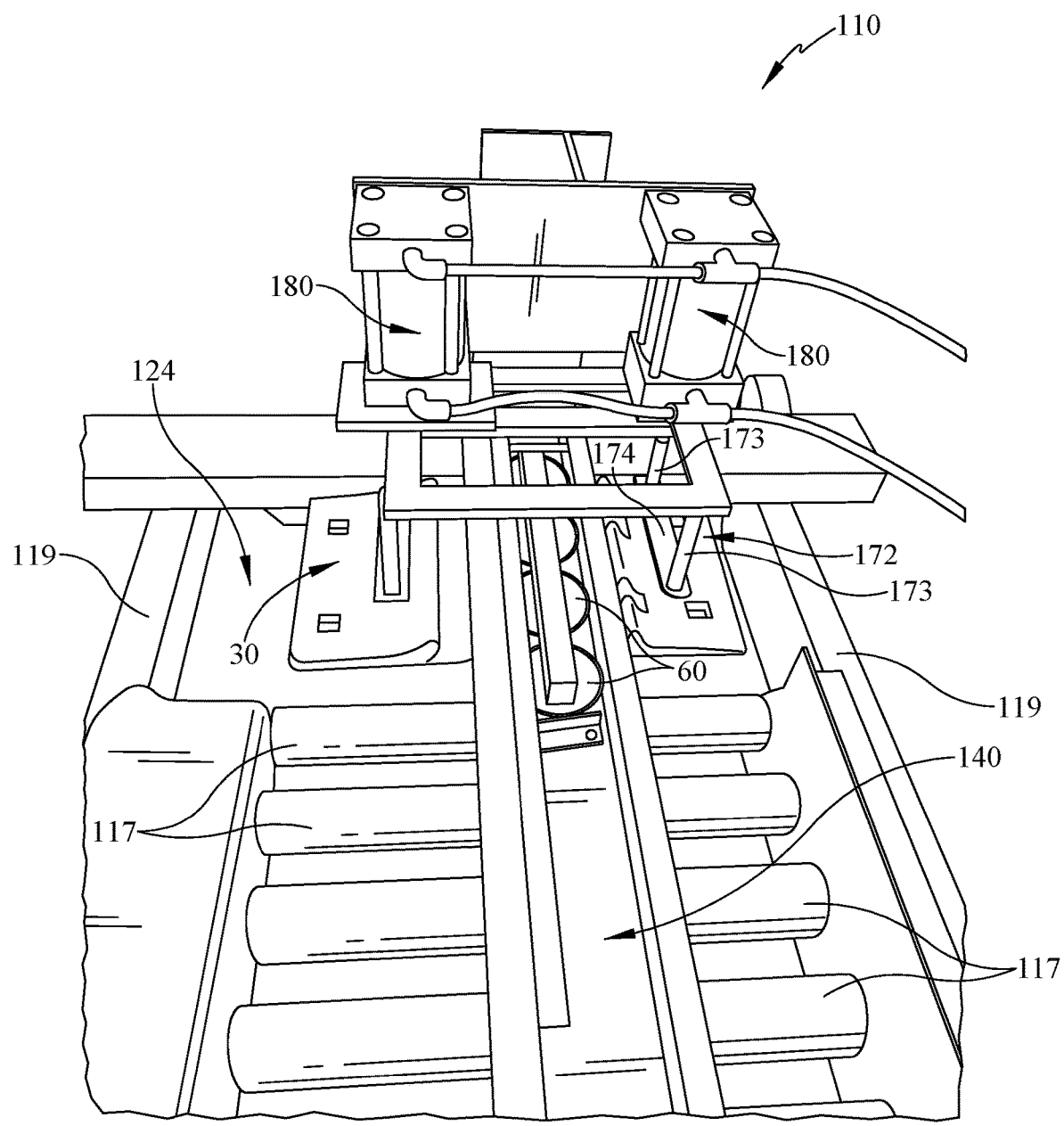
FIG. 7 is an upper perspective view of an alternate dispensing assembly.

With reference FIG. 7, the tie plate dispenser 110 is shown in perspective view with side supports 119, rollers 117 extending between, and a guide 140 extending longitudinally. The device may also function alternately so that the hammer 172 is extending around the guide 140, rather than through the guide 40. FIG. 7 depicts an alternate embodiment having guide 140 and alternate actuator arrangement. As one skilled in the art will understand, the tie plate 30 engages the first engaged magnet 60 and is pushed forward (in the tie plate feed direction) along the at least one magnet 60 toward the opening 124. The hammer 172 has legs 173 having a width that is greater than the width of the guide 140. With the legs 173 located width-wise beyond the guide 140, actuator movement in a vertical orientation can cause disengagement of the tie plate 30 from the magnet 60 or clear the way for the subsequent tie plate to engage the magnet 60. In the depicted embodiment, the hammer 172 is shown in an upper position so that the tie plate 30 is engaged by the magnet 60. The instant embodiment shows feet 174 extending from the bottom of the legs 173 and which engage the tie plates 30 upon movement of the hammer 172 by an actuator.

As depicted, the tie plate dispenser 110 may also comprise at least one actuator 180. As shown in the depicted embodiment, the at least one actuator 180 may be two actuators. The actuators 180 may be electric, hydraulic or fluid powered, including air or liquid. In some embodiments, the actuators may also be mechanical, including spring loaded or counter balanced, and/or manual (worker forcing the tie plate off with a stick or tool for example). The at least one actuator 180 may be linear, rotational to linear or other types of actuation. The hammer 172 may also be extending downward from both sides of the guide 140 to push the tie plate 30 down on both sides of a tie plate center line and cause the tie plate 30 to drop down through the opening 124 with the bottom of the tie plate falling to its desired position.

Figure 8:
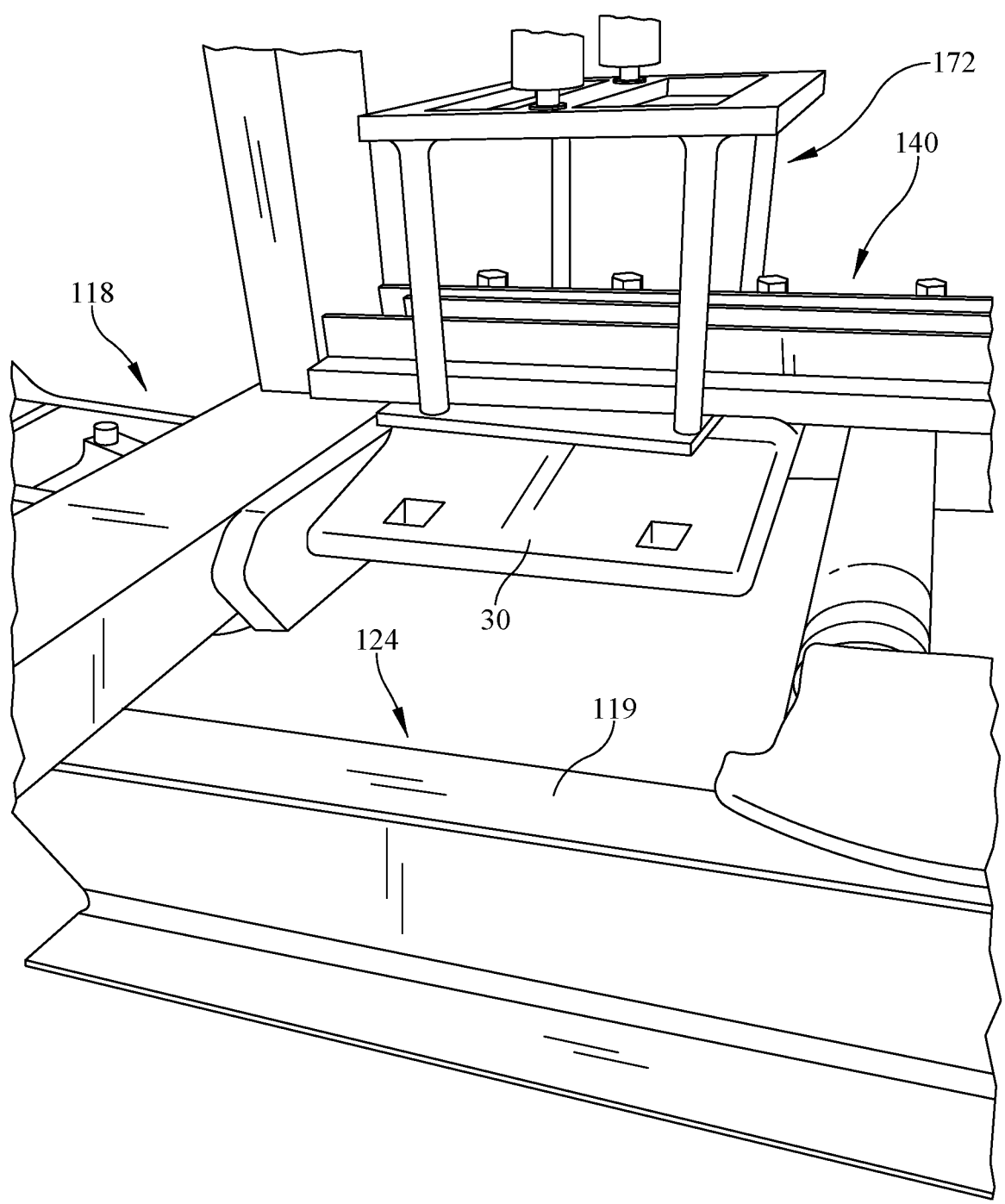
FIG. 8 is a perspective view of the dispensing assembly with one tie plate discharged and a second tie plate in position for discharge.

With reference to FIG. 8, a perspective view of the guide 140 is shown at the opening. A tie plate 30 is retained on the guide 140 by the at least one magnet 60 (FIG. 7). Below the opening, a tie plate 30 is shown which was previously discharged from the magnet 60, in order to make room for next subsequent tie plate which is shown disposed at the guide 140. Movement of the actuator 180 will push the tie plate 30 from the at least one magnet 60 downward to discharge the tie plate 30.

Actuation of the actuator 180 may occur in various manners. The actuation 180 may occur due to a distance traveled by the dispenser 10 along a track. A signal may be provided based on a distance moved by a wheel. For example, the signal may be provided at a desired interval, again for non-limiting example, pertaining to a known distance between railroad ties. Alternatively, an optical sensor may provide a signal to actuate, at which time the actuator may cause the discharge of a tie plate. In other examples, a magnet or other device may be used to provide a signal at each railroad tie and signal that a tie plate should be dropped. Further, a combination of these or other types of sensors may be utilized to provide actuation based on a distance, time, position, optical detection, Doppler signal, other characteristic or combination of any of these.

Further, while the depicted embodiments have provided the tie plate in an orientation with the shoulders up, it may also be within the scope of the embodiments that the guide be positioned in a lower elevation so that the tie plates 30 may be moved along the conveyor in a shoulders down orientation for ease of distributing in the downward shoulder orientation. In such orientation, the magnet would therefore engage the opposite side of the tie plate 30, without shoulder(s). Further, in such orientation, the tie plates 30 may be slidably supported at lateral ends. With reference to FIG. 11A, an example roller 17 is shown with a tie plate 30 disposed in first orientation. In this orientation, the tie plate 30 is right side up with the shoulders 31 in an upward facing direction.

In the alternate orientation of FIG. 11B, the tie plate 30 is oriented in an upside down orientation. For example conveyor is represented by rollers 117. In this embodiment the rollers 117 may be of a very short longitudinal dimension L. When orienting the rollers 117 in such a way, it may be desirable that the roller 117 fit between the shoulders 31 of the tie plates 30 in such downward shoulder 31 orientation. The short longitudinal dimension L of the roller 117 allows for the roller 117 to fit between the shoulders 31 of the tie plate 30. In such orientation, the guide 40 may engage the upper facing surface of the tie plate 30 in such shoulder 31 downward orientation. However, the dimensional clearance between a tie plate surface and the guide 40 may provide that there is no contact between these two surfaces. Additionally, as noted with regard to FIG. 10, the tie plate dispenser 10 may comprise actuators 126 to raise the guide 40 and decrease or eliminate contact with the tie plates 30. Accordingly, the guide 40 may only inhibit motion and to preclude flipping of the tie plates 30 during operation. Further, the guide 40 is depicted schematically as the lower portion of a beam, for example an I-beam or a T-beam. However, the beam defining guide 40 may also comprise a low friction material as previously described on a lower flange of the beam.

Figure 12:
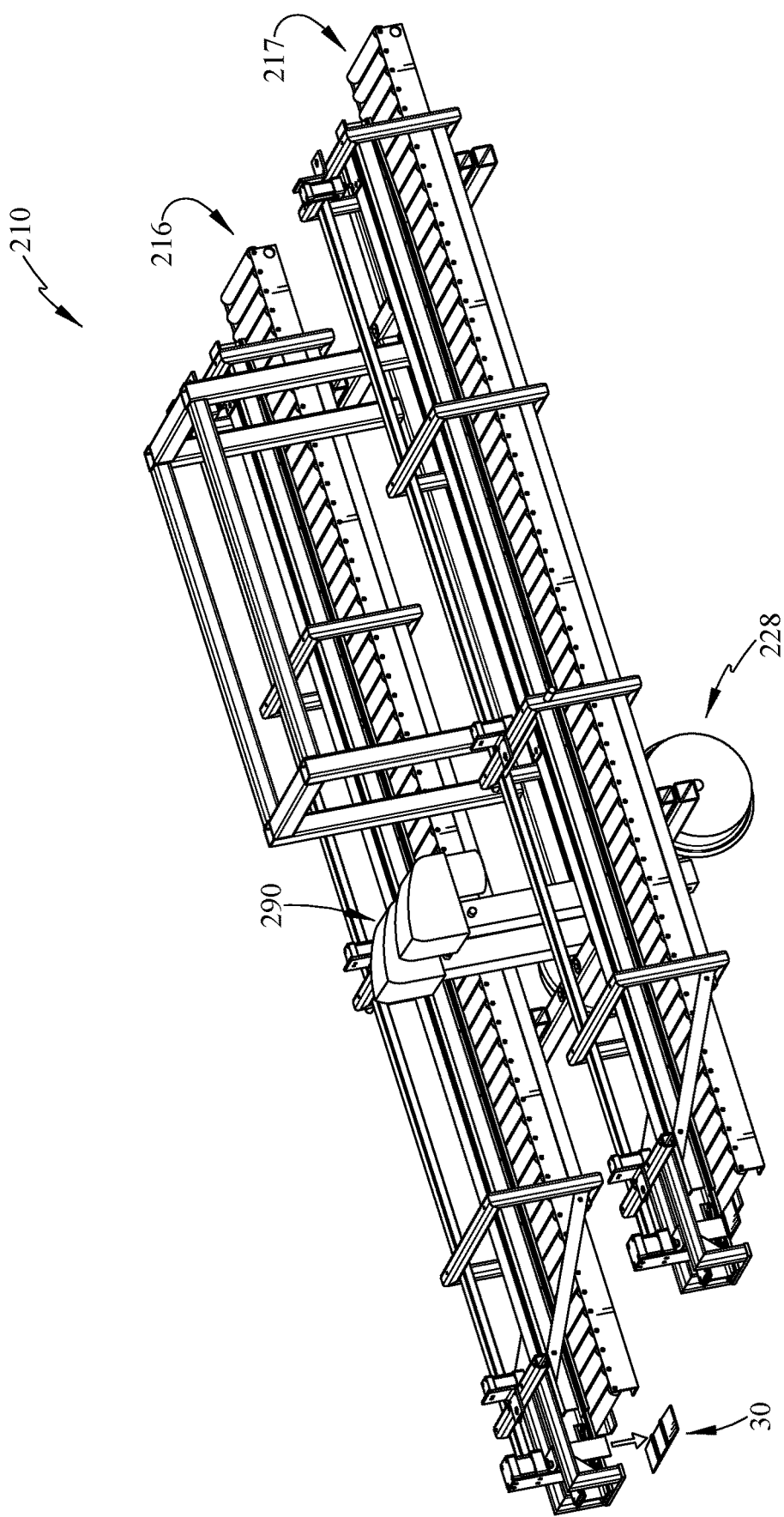
FIG. 12 is a perspective view of an embodiment of the tie plate dispenser having two conveyor surfaces for dispensing tie plates at two locations on or near a railroad tie.

Referring now to FIG. 12, an additional embodiment is utilized wherein a tie plate dispenser 210 may comprise two conveyors 216, 217 to dispense tie plates (not shown). The dispenser 210 may also be pulled behind a truck, flat bed rail car, or other type of rail device. The two conveyors 216, 217 may be parallel or may be angled relative to one another. In such embodiment, the dispenser 210 may dispense tie plates 30 at or near ends of the railroad ties. With the tie plates 30 dispensed in these positions, a rail gang or a machine may follow behind the dispenser 210 and position the tie plates 30 beneath the rails and on the rail ties. The conveyors 216, 217 are provided on a wheeled frame or buggy 228. Further, the conveyors 216, 217 may pivot from the upper end of the dispenser 210 or the entire conveyors 216, 217 may slide laterally toward and away from one another to adjust the dispensing positions.

Figure 13A:
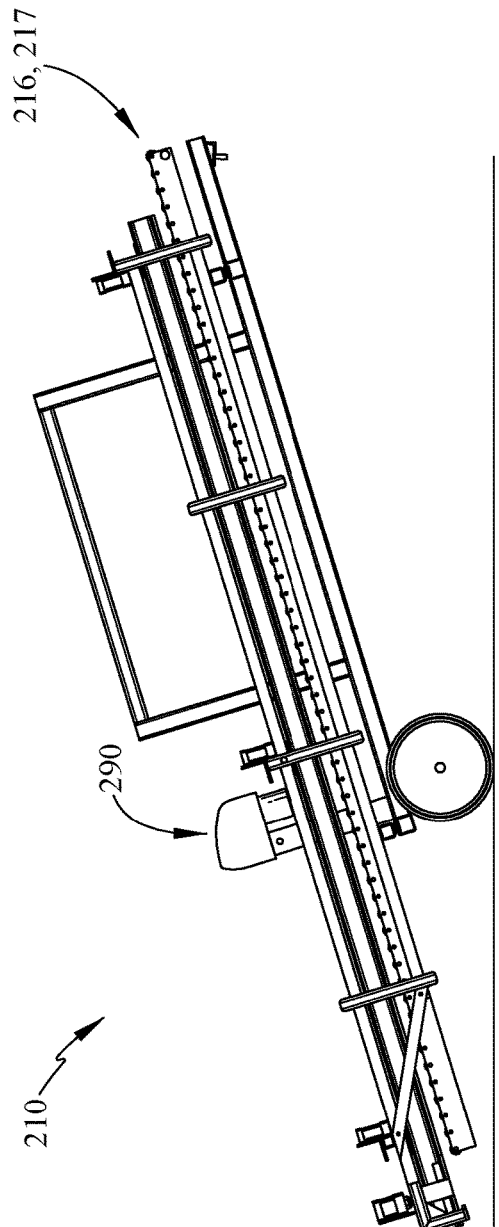
FIGS. 13A and 13B are side views showing two positions, raised and lowered, of an example tie plate dispenser; and, FIG. 14 shows an upper perspective view of a tie plate dispenser.
Figure 13B:
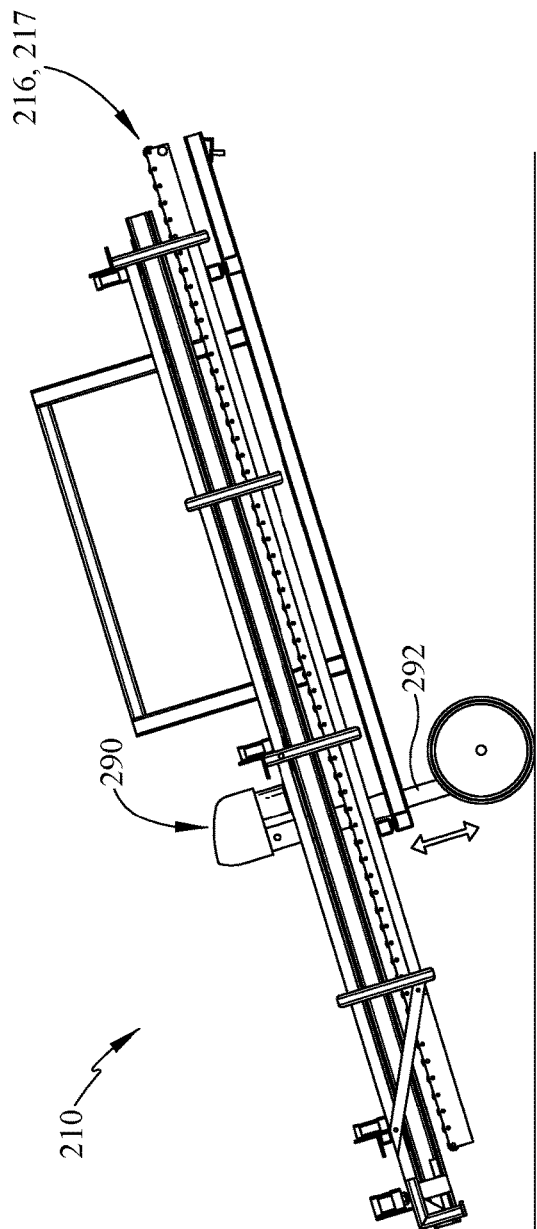

With reference now to FIGS. 12-13B, one additional feature is provided which may be used with this embodiment as depicted or in other embodiments. In some uses, it may be desirable to adjust the distance of the drop of the tie plate 30. A lower height may inhibit bouncing or flipping of the tie plates 30 to an undesired orientation and/or location. However, while the lowering of the dispensing height may be desirable for some instances, when the tie plate dispensers 10, 210 are moved along a rail system, it may also be desirable to raise the dispenser height when moving over road crossings or at rail switches so as to avoid interference of the conveyor(s) 16, 216, 217 with such structures.

Some embodiments may also provide a jack 290 which may raise or lower the dispensing end of the conveyor when the dispenser 10, 210 is being utilized. The jack 290 may be electric, hydraulic, or air powered, combinations, or other mechanisms and may operate in a variety of ways. The jack 290 may comprise various non-limiting types including, but not limited to, a vertical jack leg, a flip or folding jack leg or scissor jack system which is fluid powered, gas or liquid, or electric powered. These examples are non-limiting. The instant embodiment may comprise an electric powered motor and a gear box to cause raising and lowering of an inner or outer leg, relative to the other inner or outer leg. The jack 290 may therefore raise or lower the dispensing end of the dispensers 10, 210 to a desired height depending on the situation and what is needed. For example, the jack 290 may be connected to the frame or other support structure of the dispenser 210. An extender leg 292 extend or retract from the jack 290 and may be connected to the axle or other structure so that extension of the extender leg 292 raises or lowers the conveyor(s) 16, 216, 217.

The extender leg 292 may be square in cross-section but may be alternative shapes such as circular or other shapes which may be solid or hollow. The leg 292 may slide relative to a housing connected to the jack 290. As further alternative, the extender leg 292 may be defined by frame-type structures formed of a plurality of struts or structural members. One of the leg 292 and a housing is may be moveable relative to the other during operation. In the exemplary embodiment, the leg 292 is slidable relative to a housing from which the extender leg 292 moves from or moves into. One of the leg 292 or housing may be attached, directly or indirectly, to the axles or wheels, and the other may be connected to the frame structure to raise and lower the discharge end of the dispenser 10, 210.

Figure 14:
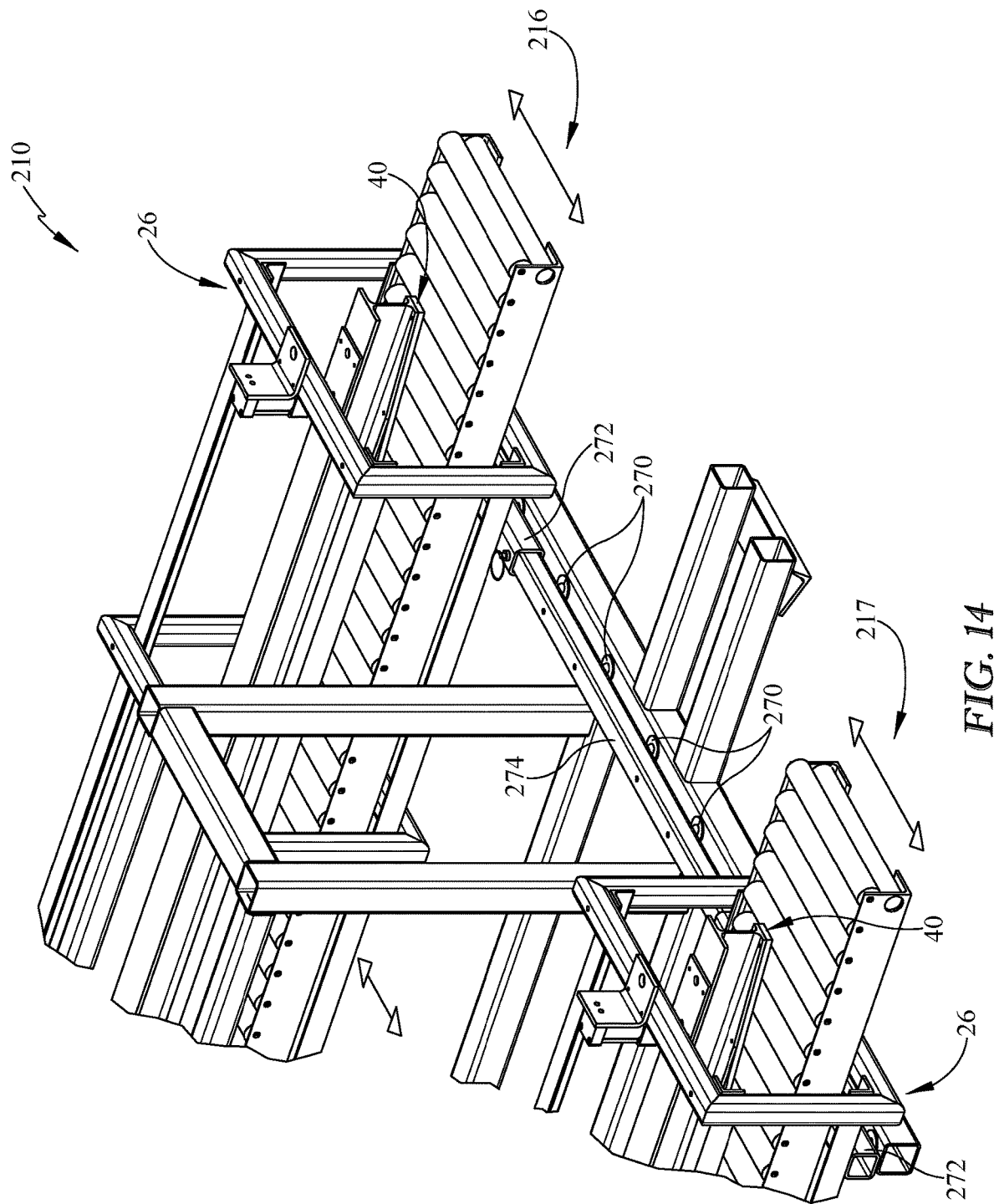

With regard to FIG. 14, a perspective view of a tie plate dispenser 210 is depicted. The conveyors 216, 217 are shown at the upper, hitch end. The instant device may provide for movement of the conveyors 216, 217. The instant system may comprise one or more bearings 270 for sliding support of a frame member 272. In some embodiments, the frame member 272 has a collar which slides over an adjacent member 274. Each frame member 272 supports the conveyor 216, 217 and the frame member can slide along the bearings 270 in order to move the conveyors 216, 217 laterally. While an upper end of the dispenser 210 is shown, a similar arrangement may be used at the lower end of the conveyors 216, 217 in order to allow for the lateral movement. Additionally, a pivoting arrangement may also be used as an alternative to adjust drop position of the tie plates 30. For example, the pivot arrangement may be disposed at or near an upper end and the lower end be movable to compensate for such pivoting movement at the top of the conveyor 216, 217.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:
1. A tie plate dispenser, comprising:
a gravity feed conveyor which moves a tie plate from a first position to a second position;
a guide disposed adjacent to said gravity feed conveyor, said guide being a longitudinal extending structure that extends parallel to a longitudinal direction of said gravity feed conveyor, and said guide capable of engaging a shoulder of said tie plate and guiding said tie plate along said gravity feed conveyor;

said guide being movable and capable of positioning said tie plate relative to a rail base defined between said shoulder and a second shoulder of said tie plate.

2. The tie plate dispenser of claim 1, further comprising a guide frame which supports said guide.

3. The tie plate dispenser of claim 2, said guide movable in a vertical direction relative to said gravity feed conveyor and relative to said guide frame.

4. The tie plate dispenser of claim 1, said guide having a taper to a narrow size at one end.

5. The tie plate dispenser of claim 1, said tie plate being positioned on said tie plate dispenser with said shoulder and said second shoulder up.

6. The tie plate dispenser of claim 1, said tie plate being positioned on said tie plate dispenser with said shoulder and said second shoulder down.

7. The tie plate dispenser of claim 6, wherein one or more rollers may support the tie plate.

8. The tie plate dispenser of claim 1 further comprising a location for dispensing the tie plate at the second position.

9. The tie plate dispenser of claim 1 further comprising an actuator for moving said guide.

10. A tie plate dispenser, comprising:
a conveyor which has a first high end and a second low end, and a conveyor surface;
one or more tie plates capable of moving from said first high end to said second low end and be dispensed therefrom;
a guide disposed adjacent to said conveyor, said guide being tapered at said first high end, said guide engaging one or more shoulders of said one or more tie plates;
said guide being movable toward or away from said conveyor surface.

11. The tie plate dispenser of claim 10, said conveyor being a gravity feed conveyor.

12. The tie plate dispenser of claim 11, said conveyor further comprising rollers.

13. The tie plate dispenser of claim 10, further comprising a guide frame which supports said guide.

14. The tie plate dispenser of claim 10, further comprising a second conveyor.

15. The tie plate dispenser of claim 14, said conveyor and said second conveyor being parallel.

16. The tie plate dispenser of claim 14, further comprising a second guide of said second conveyor.

17. A tie plate dispenser, comprising:
a conveyor which moves a tie plate from a first position to a second position;
a guide disposed adjacent to said conveyor, said guide having a first end which tapers from a narrow width to a wider width, a second end, and longitudinally extending between said first end and said second end, said guide capable of engaging a shoulder of said tie plate and guiding said tie plate along said conveyor;
said guide being movable relative to said conveyor and capable of positioning said tie plate by a rail base defined between said shoulder and a second shoulder of said tie plate.

* * * * *